Jan. 16, 1923.
G. GRIFFITH.
AUTOMOBILE TRANSMISSION CASE TRUSS.
FILED DEC. 6, 1921.
1,442,335.
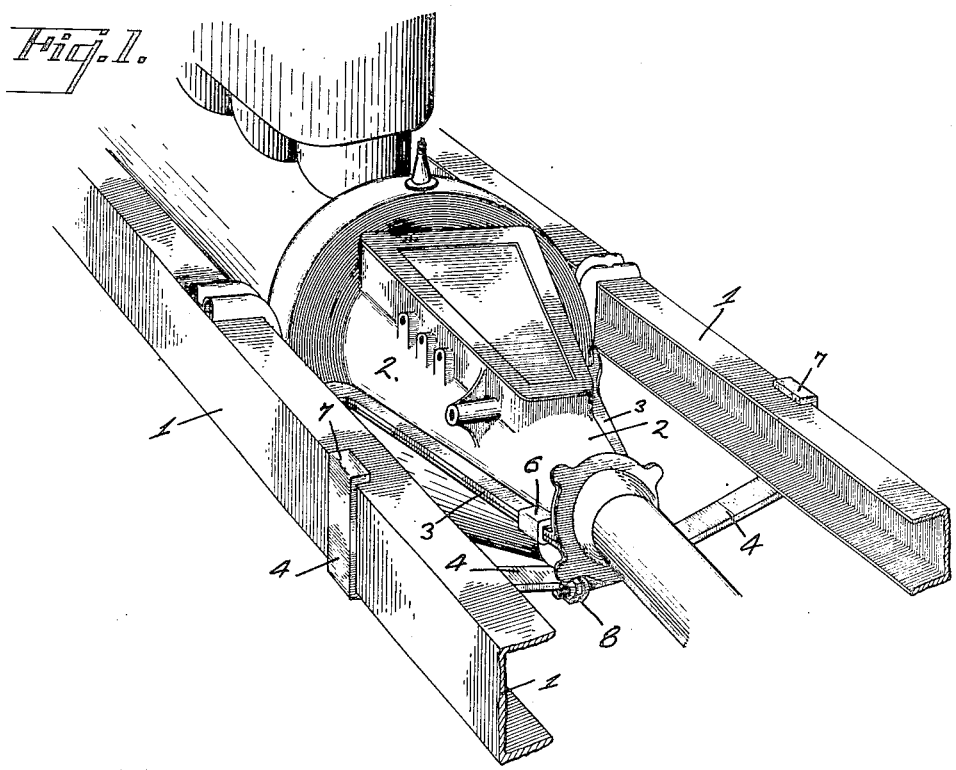
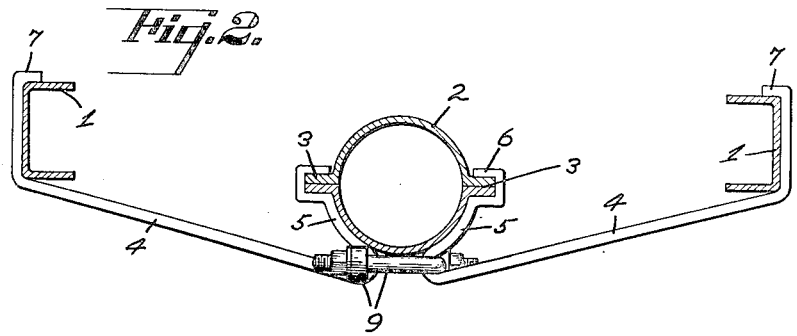
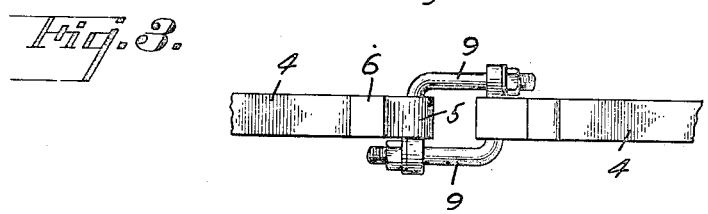
Inventor
Grame Griffith.

Patented Jan. 16, 1923.

1,442,335

UNITED STATES PATENT OFFICE.

GRAVES GRIFFITH, OF SAN FRANCISCO, CALIFORNIA.

AUTOMOBILE TRANSMISSION-CASE TRUSS.

Application filed December 6, 1921. Serial No. 520,310.

*To all whom it may concern:*

Be it known that I, GRAVES GRIFFITH, a citizen of the United States, residing in the city and county of San Francisco and State of California, have invented certain new and useful Improvements in Automobile Transmission-Case Trusses, of which the following is a specification.

The present invention relates to trusses for supporting and bracing the overhang of transmission-cases in certain makes of automobiles.

A principal object of the invention is the provision of means for the prevention of vibration in the crank and transmission cases of automobiles, thereby providing against the getting out of alignment of the driving mechanism and the consequent wear of these parts and attendant loss of power.

A further object sought in a stabilizer of the character described is to provide a device that, in addition to being efficient, will be of cheap and simple construction, and easily and readily installed and adjusted.

In the accompanying drawings, forming a part of this specification and in which like parts, throughout, are designated by similar reference characters, Figure 1 illustrates a view, in perspective, of an automobile frame and transmission-case, with the device shown installed; Figure 2 is a view in transverse section, showing manner of attachment to automobile frame and transmission-case; Figure 3 is a plan view of the adjustable connection uniting the two body-members of the device, and the means whereby adjustment of these members is secured relative to each other and to the automobile frame and transmission-case.

Referring more particularly to the drawings, 1 designates an automobile frame, 2 the transmission-case, 3 the flanges of the transmission-case, 4 the two similar truss-members, 5 the curved sections of the truss-members conforming to the contour of the conic surface of the transmission-case, 6 and 7 extremities of the truss-members 4 shaped to embrace, respectively, the flanges 3 of the transmission-case 2 and the automobile frame 1, and 8 the means adjustably connecting the truss-members 4.

The truss is comprised of two similar members 4, having, respectively, curved sections 5 conforming to sections of the conical surface of the transmission-case 2, extremities 6 and 7 formed to embrace, respectively, the flanges 3 of the transmission-case 2 and the automobile frame 1, and an adjustable connecting means 8 for uniting the two members 4, comprised of two eye-bolts 9, with bodies bent right-angularly, the threaded end of the one entering the eye of the other and fitted with nuts for securing them in position and effecting adjustments.

Having thus described the character and purpose of my invention, I claim, and desire to secure by Letters Patent:

1. The combination, in a device of the character described, of an automobile frame and a transmission-case, truss members extending from opposite sides of said transmission-case to the adjacent side member of said automobile frame, said truss members having each an extremity shaped to partly embrace and be suported by said side member of said frame and an extremity each so shaped as to embrace opposite flanges of said transmission-case, and means, as set forth, for connecting said truss members and adjustably regulating the tension therebetween, whereby movement, in any direction, of said transmission-case is prevented.

2. In combination, in a device of the character described, an automobile frame and a transmission-case, truss members extending respectively from opposite flanges of a transmission-case to the adjacent sides of an automobile frame, the said truss members having each an extremity shaped to embrace respectively opposite flanges and portions of a transmission-case and an extremity each shaped respectively to pass beneath an adjacent side of said frame and upwardly therealong and hook over the top thereof, and means, as set forth, for connecting said truss members and adjustably regulating the tension therebetween.

3. The combination, in a device of the character described, of an automobile frame and a transmission-case, truss-members respectively suspended from and supported by opposite sections of said automobile frame and extending therefrom to and engaging and supporting said transmission-case, coupling means comprising a pair of eye-bolts having angularly formed bodies and arranged to engage as an adjustable unit in connecting the said truss-members, and means carried by the said coupling means for tension adjustment relative to the individual members of said pair and the said automobile frame and said transmission-case.

GRAVES GRIFFITH.